No. 841,635. PATENTED JAN. 15, 1907.
W. M. DAILEY.
FOOT PROPELLED VEHICLE.
APPLICATION FILED FEB. 28, 1906.

2 SHEETS—SHEET 1.

Witnesses
C. K. Reichenbach.
F. C. Jones

Inventor
W. M. Dailey.

By
Attorneys.

No. 841,635. PATENTED JAN. 15, 1907.
W. M. DAILEY.
FOOT PROPELLED VEHICLE.
APPLICATION FILED FEB. 28, 1906.

2 SHEETS—SHEET 2.

UNITED STATES PATENT OFFICE.

WILLIAM M. DAILEY, OF CHAUNCEY, OHIO.

FOOT-PROPELLED VEHICLE.

No. 841,635.      Specification of Letters Patent.      Patented Jan. 15, 1907.

Application filed February 28, 1906. Serial No. 303,467.

*To all whom it may concern:*

Be it known that I, WILLIAM M. DAILEY, a citizen of the United States, residing at Chauncey, in the county of Athens, State of Ohio, have invented certain new and useful Improvements in Foot-Propelled Vehicles; and I do hereby declare the following to be a full, clear, and exact description of the invention, such as will enable others skilled in the art to which it appertains to make and use the same.

This invention relates to vehicles, and more particularly to foot-propelled vehicles, and has for its object to provide a vehicle provided with means for propelling it by foot-power which will be simple in arrangement and by means of which the vehicle may be easily moved over the ground.

Other objects and advantages will be apparent from the following description.

Figure 1:
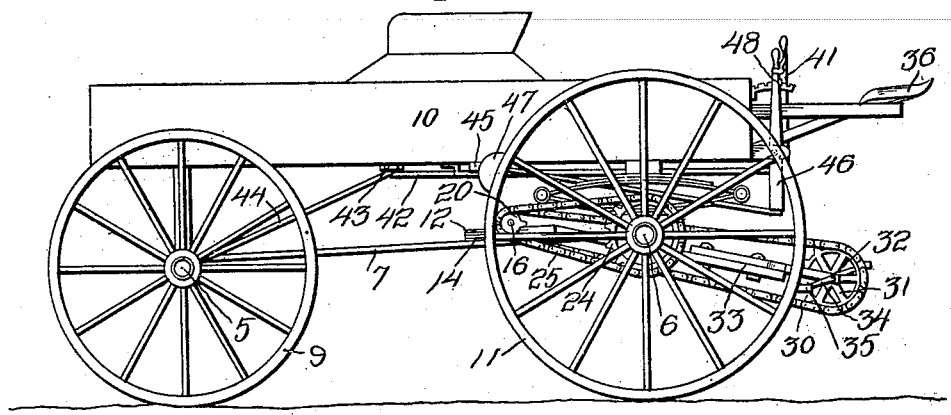
Figure 2:
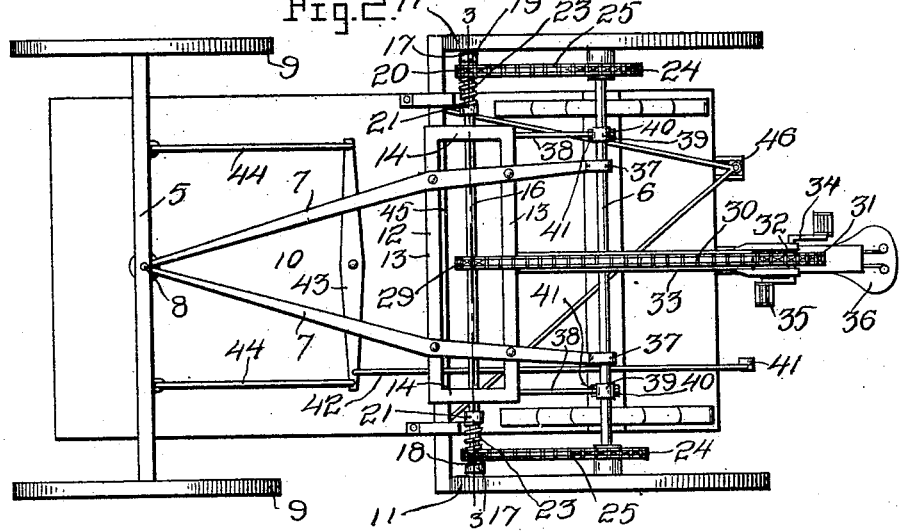
Figure 3:
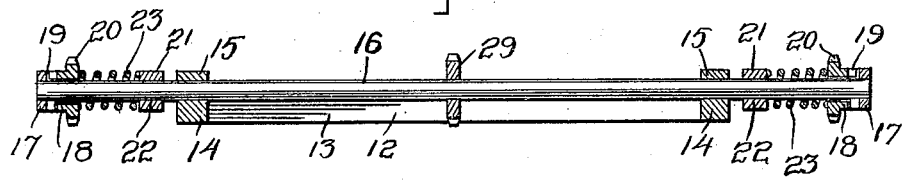
Figure 4:
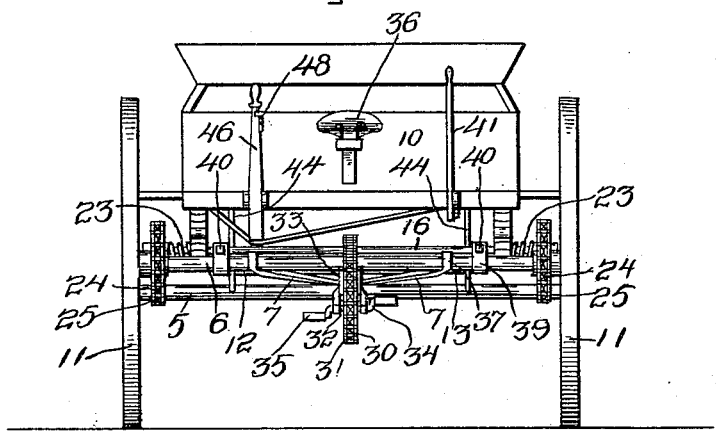

In the drawings forming a portion of this specification, and in which like numerals of reference indicate similar parts in the several views, Figure 1 is a side elevation of the present invention. Fig. 2 is a bottom plan view. Fig. 3 is a section taken on line 3 3 of Fig. 2 longitudinally of the counter-shaft. Fig. 4 is a rear elevation.

Referring now to the drawings, the present invention comprises front and rear axles 5 and 6, which are connected by forwardly-convergent reach-poles 7, the front axle being mounted for pivotal movement with respect to the reach-pole, as shown at 8, and being provided with wheels 9. A body 10 is mounted upon the axle.

Driving-wheels 11 are loosely mounted upon the ends of the rearward axle 6, and mounted upon the reach-pole 7, forwardly of the rear axle and adjacent thereto, there is a transversely-extending frame 12, including longitudinal side pieces 13 and connecting end pieces 14, the latter having bearing-blocks 15 secured thereto, in which there is journaled a counter-shaft 16, which extends longitudinally of the frame 12 and transversely of the vehicle.

Secured upon the ends of the shaft 16 there are inwardly-directed clutch members 17, and slidably mounted upon the counter-shaft, inwardly of the members 17, there are clutch members 18, movable longitudinally upon the shaft into and out of coöperative position with the members 17. The fingers 19 of the clutch members 17 and 18 are beveled to permit of forward rotation of the wheels upon the shaft 16 independently of the members 18, and each of these members 18 carries a small sprocket 20. Blocks 21 have central passages 22, in which the shaft 16 is secured, these blocks being located upon the shaft inwardly of the members 18, and helical spring 23 are engaged with the shaft 16 between the blocks 21 and the members 18 to hold the latter yieldably in coöperative relation to the members 17. Large sprockets 24 are secured to the wheels 11, concentrically therewith, and chains 25 are engaged with the corresponding sprockets 24 and 23. By reason of the beveling of the fingers 19 it will be seen that differential movement of the wheels 11 is permitted.

The shaft 16 carries a small sprocket 29, which is connected by means of a chain 30 with a large sprocket 31, the sprocket 31 being carried by a transverse crank-shaft 32, mounted in a longitudinally-adjustable bracket which extends beyond the rearward end of the vehicle, the bracket being shown at 33, and by reason of the longitudinal adjustment of the bracket the tension of the chain 30 may be varied. Crank-arms 34 are carried by the shaft 32 and are provided with pedals 35.

A seat 36 is mounted above the crank 32 in position for the feet of an occupant of the seat to rest upon the pedals 35 to drive the vehicle.

The rear axle 6 is slidably connected with the reach-poles 7, as shown at 37, and rods 38 are secured at their forward ends to the frame 12 and are slidably engaged at their rearward ends in brackets 39, carried by the axle 6, nuts 40 being engaged with the rods rearwardly of the brackets and bearing against the latter for operation to move the axle forwardly, and similar nuts 41 are engaged with the rods forwardly of the axle to move the latter rearwardly, as will be readily understood. In this way the chains 28 may be tightened or loosened, as desired.

A hand-lever 41 lies within reach of the seat 36 and is connected by means of a rod 42 with a transversely-extending pivoted member 43, connected at its ends by means of rods 44 with the front axle 5 at opposite sides of the pivot-point thereof, and it will thus be seen that the vehicle may be steered by moving the lever 41. A brake mechanism 45 is provided and is connected with the hand-lever 46 for movement of its shoes 47 into and out of engagement with the wheels 11 when the hand-lever is moved, and a rack-segment is provided for engagement by a dog upon the hand-lever 46, there being thus provided means 48 for holding the brake mechanism in and out of operative position.

What is claimed is—

1. In a vehicle of the class described, the combination with front and rear axles, of a body mounted upon the axles, connecting reach-poles for the axles, the front axle being arranged for pivotal movement in a horizontal plane, wheels for the front axle, wheels revolubly mounted upon the rear axle, a frame secured to the reach-poles, a counter-shaft journaled transversely of the vehicle in the frame, connections between the counter-shaft and the rear wheels, said connections being arranged to permit of independent forward rotation of the wheels, a longitudinally-adjustable rearwardly-extending bracket, a crank-shaft mounted in the rearward end of the bracket, pedals carried by the cranks of said shaft, operative connections between the crank-shaft and counter-shaft, said rearward axle being movable toward and away from the counter-shaft, means for holding the axle at different points of said movement, a seat located adjacent to the crank-shaft, means located adjacent to the seat and connected with the front axle for movement of the latter to steer the vehicle, and brake mechanism for the vehicle.

2. A vehicle of the class described comprising front and rearward axles, connections between said axles, a body surmounting the axles, a counter-shaft, means for driving the counter-shaft, wheels revolubly mounted upon the rear axle inwardly-directed clutch members carried by the outer ends of the counter-shaft, clutch members slidably mounted upon the counter-shaft inwardly of the first-named clutch members for movement into and out of coöperative relation with the first-named clutch-shaft, sprockets carried by the inner clutch members, sprockets carried by the wheels of the rear axle, chains engaged with the corresponding sprockets of the clutch members and wheels, the coöperating clutch members having mutually-engaging fingers beveled to permit of independent forward movement of the wheels, blocks mounted upon the counter-shaft inwardly of the clutch members, helical springs engaged with the counter-shaft between the blocks and the inner clutch members and arranged to hold said inner clutch members yieldably in engagement with the other clutch members, and wheels for the front axle.

In testimony whereof I affix my signature in presence of two witnesses.

WILLIAM M. DAILEY.

Witnesses:
J. B. CLAYTON,
A. J. FRAME.